(12) United States Patent
Gosalia

(10) Patent No.: US 10,594,818 B2
(45) Date of Patent: Mar. 17, 2020

(54) MACHINE-READABLE CODE DISPLAYS FOR RETRIEVAL OF ASSOCIATED CONTACT DATA BY UNKNOWN DEVICES

(71) Applicant: PAYPAL, INC., San Jose, CA (US)

(72) Inventor: Jigar Rajnikant Gosalia, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 37 days.

(21) Appl. No.: 15/917,367

(22) Filed: Mar. 9, 2018

(65) Prior Publication Data
US 2019/0281126 A1 Sep. 12, 2019

(51) Int. Cl.
| | |
|---|---|
| *H04L 29/08* | (2006.01) |
| *G06K 7/10* | (2006.01) |
| *H04W 4/021* | (2018.01) |
| *G06K 7/14* | (2006.01) |

(52) U.S. Cl.
CPC .......... *H04L 67/26* (2013.01); *G06K 7/10722* (2013.01); *G06K 7/1413* (2013.01); *G06K 7/1417* (2013.01); *H04W 4/021* (2013.01)

(58) Field of Classification Search
CPC .............................. H04L 67/26; H04W 4/021
USPC .... 455/456.1, 404.1, 404.2, 414.1, 418, 415
See application file for complete search history.

(56) References Cited

U.S. PATENT DOCUMENTS

| | | | | |
|---|---|---|---|---|
| 8,863,172 | B2* | 10/2014 | Hardin | H04N 21/2385 725/32 |
| 2004/0022264 | A1* | 2/2004 | McCue | H04L 51/34 370/464 |
| 2013/0290013 | A1* | 10/2013 | Forrester | G16H 40/63 705/2 |

* cited by examiner

*Primary Examiner* — Nghi H Ly
(74) *Attorney, Agent, or Firm* — Haynes and Boone LLP

(57) ABSTRACT

There are provided systems and methods for machine-readable code displays for retrieval of associated contact data by other devices. A user may establish a machine-readable code with a service provider that corresponds to contact data of selected associates of the user, such as friends, family members, or assistance personnel. The contact data may be directed encoded into the machine-readable code or may be stored with the service provider so that when the code is captured, the contact data may be retrieved. The machine-readable code may be displayed on a fixed physical object or output by a mobile device of the user. When an unknown user comes across the visual code, the unknown user may capture the machine-readable code so that the unknown user may communicate a status of the user (e.g., an injury, accident, or requirement needed by the user) to the user's established contacts.

20 Claims, 6 Drawing Sheets

MACHINE-READABLE CODE DISPLAYS FOR RETRIEVAL OF ASSOCIATED CONTACT DATA BY UNKNOWN DEVICES

TECHNICAL FIELD

The present application generally relates to retrieving contact information and communication with contacts of a user, and more specifically to determining device contact identifiers for devices of a user's contact based on a displayed machine-readable code.

BACKGROUND

During everyday activities, users may encounter various occurrences that require an alert or notification to be sent to one or more known associates, such as a friend, family member, or selected assistance provider or personnel (e.g., medical personnel, authority personnel or police, vehicle service providers, etc.). If the user is capable of contacting the known associate, the user may utilize a mobile device to contact the associated user or entity. If the user becomes incapacitated, their mobile device no longer is operational, or another event occurs where the user is unable to contact the associated user/entity, one or more nearby users may wish to inform the associated user/entity of the user's present status or request assistance. However, the nearby users may not have the proper contact information to quickly inform or communicate with the associated user/entity. Because it is also common to lock mobile devices from unauthorized use with passcodes or personal identification numbers (PINs), nearby users attempting to assist the user may also be unable to the user's mobile device for contact information needed to request assistance or alert the other user/entity of the user's present status.

Figure 1:
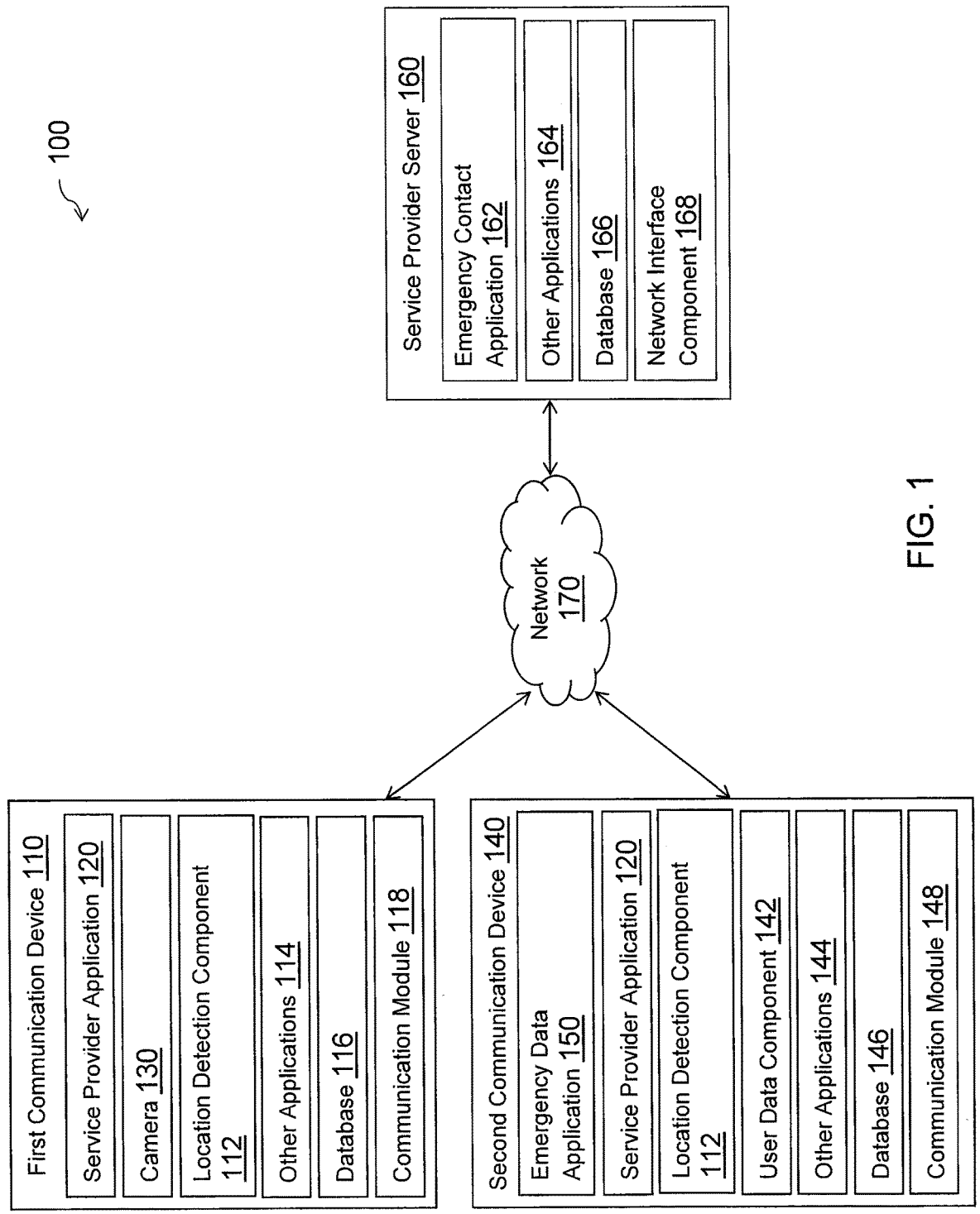
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for machine-readable code displays for retrieval of associated contact data by other devices. Systems suitable for practicing methods of the present disclosure are also provided.

A service provider, such as an entity providing one or more services to groups of users, may provide a platform that allows a user to register a specific displayable image, mark, code, picture, object, graphic, or other visual machine-readable sign and associate particular contact data for the user or known associates/contacts (e.g., friends, family, registered assistance, etc.) of the user with the machine-readable sign so that when the machine-readable sign is captured by a device of another user that may be known or unknown to the user, specific contact data may be retrieved and used by the service provider and/or device of the other user. In this regard, the user may display the visual sign on a physical object, which may be permanently affixed and static (e.g., a sticker, keyfob, wallet card, mobile device casing or exterior, temporary/semi-temporary/permanent physical marking (including etchings, paint, markings, and/or tattoos), or other static image) or may be dynamic (e.g., the background of a lock screen interface on a mobile device). If the user registering the machine-readable sign becomes incapacitated, loses the object with the machine-readable sign, or otherwise is unable to communicate with the contacts associated with the visual sign, the other user using their device to capture the sign may then do so on behalf of the user. The machine-readable sign may include a marking or instruction that informs the other user to capture content of the sign (including what process or application to use for capture) if the other user wishes to contact the pre-set contact data associated with the sign for the user. The other user's mobile device and/or the service provider may process the data associated with the captured sign, and may communicate directly or indirectly to one or more devices for the contacts set with the machine-readable sign using the contact data. The communications may also include specific data associated with the user having the sign and/or the other user that captures the sign, including images/videos, locations, time of day, and/or messages. In this manner, contact information for known contacts/associates of a user may be obscured from unnecessary proliferation and viewing by unknown or random members of the public, while still providing unknown strangers of the user a manner to alert the user's contacts even if the user's device is locked and contact data on the device is inaccessible. The visual sign may also allow specific registered users to receive certain data when capturing the sign of a user, such as a medical or police personnel with background information on the user in possession of the sign.

In order to provide these services, the online service provider may provide account services to users of the online service provider, as well as other entities requesting additional services, which may be used to register a machine-readable sign and associate contact data with the machine-readable sign. A user wishing to establish the account may first access the online service provider and request establishment of an account. The account may be established by providing account details, such as a login, password (or other authentication credential, such as a biometric fingerprint, retinal scan, etc.), and account creation details. The account creation details may include identification information to establish the account, such as personal information for a user, business or merchant information for an entity, or other types of identification information including a name, address, and/or other information. In order to create an account, the user may be required to select an account name and/or provide authentication credentials, such as a password, personal identification number (PIN), answers to security questions, and/or other authentication information. Once an account is created, the account may be accessed through a web browser from a website of the service provider and/or a dedicated application of the service provider, such as a mobile smart phone application. The application or website of the service provider, such as PayPal® or other online service provider, may also provide payments and the other transaction processing services. A token may be issued to the device of the user for their respective personal account, where the token may include data (which may be encrypted) allowing the service provider to identify the user and their account and authenticate the user.

After establishment of an account by a first user, the first user may then select and register a machine-readable sign or other image that can be captured by a camera of another device. The visual sign may be two-dimensional or may be three-dimensional as a physical object or projection. The first user may select the sign from available machine-readable signs or codes that the service provider offers or may upload an image that the first user wishes to utilize as the machine-readable sign. The service provider may also process a selected or uploaded machine-readable sign to determine whether the machine-readable sign is unique for the first user and/or uncommon enough that the machine-readable sign is likely to correspond only to the first user when used and the first user's contact information may be determined using the machine-readable sign (e.g., based on geo-locations of the first user). The service provider may also generate a machine-readable code or sign, such as a barcode, QR code, Rorschach ink blot, etc., that is unique or uncommon such that the machine-readable code is likely to only apply to the first user. In such embodiments, the machine-readable sign may also be directly encoded with data that may make the machine-readable code or sign unique for the first user. Selection and/or confirmation of the machine-readable sign for the first user may be done through one or more registration interfaces for the machine-readable sign provided by the service provider in the service provider's application or website.

After selection of the machine-readable sign for use by the first user with contact data, the first user may then be required to associate the contact data with the machine-readable sign. The first user may enter contact data through the registration interface(s) for the service provider, which may correspond to a name, device identifier, and/or contact details for one or more associates or contacts of the first user. An associate or a contact may correspond to a user known to the first user, including friends, family, care providers, and/or assistance providers, which may assist the first user or another user capturing media data of the machine-readable sign when the machine-readable sign is captured by the another device. For example, a spouse of the first user may wish to be informed if the first user is in an accident, loses their mobile phone, becomes locked out of a vehicle without their mobile device, or is otherwise unable to use the phone, and thus a communication identifier (e.g., email, phone number, messenger number for a messaging application, account name, etc.) may be set with the machine-readable sign for the first user. The first user may also enter in a general message that is sent when the machine-readable sign is captured, such as an alert that the first user's set contact(s) may receive. The first user may enter the communication identifier with the machine-readable sign. In certain embodiments, the first user's contact data may be mined or scraped from available data for the first user, such as a contact list application, social networking contacts, sent messages, transaction history, etc. This may be done so that the first user may select these known contacts during registration of the machine-readable sign, or may be done continuously and at the time that the machine-readable sign is captured to determine a contact for the first user.

For example, social contacts used by the service provider may include online social networking services. Known contacts of the first user (e.g., social networking friends, address book contacts, stored images, etc.) may be processed to determine potential contact identifiers that may be associated with the machine-readable sign. The first user may utilize online platforms, resources, and/or services to share information with other users, which may include a friend's list of contacts as well as posts and messages between users. In other embodiments, the users may utilize different types of online services to share information and/or perform messaging, including media sharing services (e.g., for sharing of images and/or videos, such as YOUTUBE®, INSTAGRAM®, or IMGUR®), a microblogging service (e.g., for sharing of small text blog posts and/or images/videos, such as TWITTER®), or other online service. Messages between the first user and other contact users may also be exchanged on other platforms, including data exchanges through a messaging, email, or online social networking/microblogging platform may also be used to determine contacts for the visual sign. The messages may correspond to direct messages, tags, or data sharing between users. The messages may also correspond to messages with a shared contact, such as a known user, which may also be one of the users within the geo-fenced area. Thus, a messaging chain or shared messaging links and data shares may be used to determine the contacts of the first user for the machine-readable sign.

Once the contact data has been registered with the machine-readable sign, the first user may then utilize the machine-readable sign. As discussed herein, the machine-readable sign may be affixed to a physical object and may be static, or the machine-readable sign may be output by a device, such as displayed on a mobile device screen of the first user. The output by the device may depend on certain parameters, including location, whether the device is locked, biometrics of the first user, or unlock request that is failed or by another user (e.g., with an unknown fingerprint). The service provider may provide physical objects having the machine-readable sign to the user, including providing a printable version of the machine-readable sign, issuing a token or physical object to the first user, or otherwise providing the first user with the machine-readable sign. The machine-readable sign may also include an identifier, instructions, logo, or other signifying feature that identifies the machine-readable sign for use with the service provider, such as a logo of the service provider so that other user's known the recipient of media data of the machine-readable sign (e.g., a website or address to submit the media data, an application used to capture the media data, etc.). Thus, when some event occurs where the first user is unable to communicate with another contact, such as if the first user is injured, the first user is in trouble or absent and their machine-readable sign remains (e.g., in the event of a kidnapping or other disappearance), if the first user does not have their mobile device but is in possession of their machine-readable sign (e.g., if they first user loses their mobile device and needs to contact another user, locks their device within a location or vehicle, or otherwise does not have communication resources/capabilities with other users), the first user loses the physical object having the machine-readable sign, and/or the first user is in a registered location where a contact may be required for the first user and historical data for the first user may be needed (e.g., within a hospital, police station, secure location, etc.), another second user may capture the visual sign and communications with the first user's contact(s) may be established and/or performed by the second user's device or the service provider.

In one embodiment, the machine-readable sign is displayed, such as electronically through a screen of the user device, only when certain conditions are detected that indicate the user may need assistance. For example, after a certain period of phone inactivity that is not consistent with historical activity during a location or time may trigger the phone to display to the machine-readable sign. In another example, data from either sensors on the phone or a wearable device of the user may trigger a display, such as abnormally high or low heart rates or breathing, abnormally high or low body temperatures, and any type of biometric reading indicating the user is not in a normal or expected state.

Thus, a second user may capture media data (e.g., visual or audiovisual image or video data) associated with the machine-readable sign when an event occurs that may need communication with the first user's set contacts. Note that the media data may be the machine-readable sign, contained within the machine-readable sign, or accessible through the machine-readable sign. The machine-readable sign may include a logo or other icon of the service provider such that the second user may know how to capture the media data of the machine-readable sign and/or where to send/transmit data. In various embodiments, the machine-readable sign may include instructions for capture/transmission of the media data, such as instructions of where to send the media data, a process to record and send the media data to the service provider, an application to download and/or use with the machine-readable sign to capture/send the media data, or other instructions. The machine-readable sign may also include encoded data or a process to execute one of these processes when capturing the media data using a camera, which may cause transmission of the media data to the service provider, downloading of an application, or navigation/retrieval to a website/contact address to submission of the media data. The second user may therefore use a device, such as a mobile smart phone having a camera and processing features, to capture media data of the machine-readable sign and transmit the media data or other data to the service provider.

The captured media data may also be transmitted with metadata for the media data and/or additional data associated with capture of the media data. Such data may include a location of capture of the media data, as well as a time that the media data is captured. The location may be determined using a geo-location detection device (e.g., GPS coordinates determined through a GPS locator of the second user's device). The location may also be entered by the second user. In order to prevent falsification of a contact notification using the machine-readable sign, a location of the first user and/or first user's device may be matched to the location provided with the media data so that the service provider may determine that the first and second users are within a proximity range and the second user is within a distance to capture the media data of the first user's machine-readable sign at the time of capture of the media data. Such range may correspond to a geo-fence around the first user and/or second user where the other user is required to be detected within during the submission of the media data. Moreover, the first user may be notified on their mobile device associated with the machine-readable sign that another user is attempting to communicate with their contacts using the machine-readable sign to further prevent falsification of contact notifications using the machine-readable sign where the first user is able to communicate with their contacts. Such messages may be privately sent to the first user and required to be viewed after entering authentication credentials in case a malicious party has appropriated the first user's device.

The service provider may generally communicate with each contact associated with the machine-readable sign after receipt of the media data and determination of the contact data using the media data of the sign. The service provider may decode the machine-readable sign in the media data to determine the contact data, or may perform image matching/recognition of the machine-readable sign using a database of stored machine-readable signs for users. The service provider may also determine one or more specific contacts of the first user to receive a notification based on preset preferences by the first user and/or the geo-location of the first user and/or second user. For example, certain users may be contacted depending on the current status of the first user. The current status may be determined based on information entered by the second user with the media data, such as a "health issue," "accident," "lost phone," "locked out," "insufficient funds," "potential crime," or other status. The current status may also be determined through image analysis and identification of possible status issues causing the second user to capture the media data. In such embodiments, a specific contact may be selected based on the first user's status, such as a doctor of the first user for a health issue or a spouse for a locked out or lost phone. More than one contact may also be set to receive a notification for each status, such as the spouse and doctor for a health issue.

The contact(s) determined by the service provider to receive notifications may also depend on the location for the first user/second user and/or the current status or issue for the first user. For example, the location of the first user may be determined through the first user's device and/or the second user's device (or the metadata for the media data captured by the second user's device). The location(s) may be determined through GPS or other location detection service, through signal triangulation, or through data input by the second user. A geo-fence may be established around the location(s), where the geo-fence defines a proximity range, radius, or distance around or nearby the first user where acceptable contacts may be searched based on their geo-location. The geo-fence may be established based on an acceptable proximity range, such as distance would allow the contact to come to the aid of the first user, or may be established based on the geography of the physical location around the user. The geo-fence therefore corresponds to a range to perform geo-location detection by the service provider of the contacts of the first user and find a closest contact. In other embodiments, the closest contact may be found irrespective of using a geo-fence. Using the geo-fence, the geo-locations of the first user's contacts may be determined through a geo-location enabled device of the contacts, such as a GPS or other location detection system of a contact's mobile device. This allows the service provider to use the closest contact of the first user to receive a notification about the status of the first user that caused the second user to capture media data of the first user's visual sign. In further embodiments, any contact associated with the machine-readable sign may be contacted, such that even if a contact is across the country, that contact may be able to reach others to assist the first user.

The service provider may also determine a communication pathway, process, or protocol used to communicate with the selected contact of the first user. The communication pathway may be entered by the first user when registering the contact, or may be selected based on the identifier and known communication pathways/protocols available based on the identifier. For example, if the identifier is a phone number, an SMS message or voice phone call may be selected as the pathway to communicate with the contact. The service provider may also process messages by the first user with the contact and/or other communications by the contact to determine the pathway/protocol. The contact may therefore correspond to a third user known to the first user and associated with the machine-readable sign. Once a communication pathway is determined, the service provider may generate a notification, alert, or other communication for the contact of the first user. Generally, the message for the contact may include at least a notification that the second user captured the first user's sign, such as a notification that the first user may require assistance. In other embodiments, the message may instead be for the second user, and may provide the second user with contact data for the first user's contacts or selected contact. Thus, the message may be transmitted back to the second user in certain embodiments to allow the second user to communicate with the contact on behalf of the first user or allow the first user to use the second user's device to communicate with the contact (e.g., where the first user requires assistance with opening a locked door or receiving sufficient funds).

Where the service provider sends the message to the contact, the message may also include the location determined for the first user and/or second user, as well as a time that the media data was captured. The message may further include additional information determined by the service provider and/or provided by the second user when capturing the media data. For example, the second user may provide information about the reason for capturing the machine-readable sign, such as a status of the first user, accident or event information for an event that the first user was involved in, a message from the first user, and/or additional images/video obtained or captured by the second user through the machine-readable sign and/or the event occurring that caused capture of the machine-readable sign. The service provider may also determine certain data about the event that caused the second user to capture the media data of the machine-readable sign, such as weather conditions, news (e.g., information from a news/police feed), current visitors or checked in users (e.g., at a facility, including a health care facility), or other information. The service provider may match the information to the first and/or second user and may provide the information in the message to the contact. The service provider may also allow the contact to communicate with the second user that captured the media data using the device of the second user. For example, the service provider may also provide an identifier for the second user's device in the message so that the contact may communicate with the second user to receive additional information about the first user and/or allow the first user to communicate with the contact. The second user may select a communication pathway/protocol/device to receive communications from the contact, or the service provider may provide such services through the application used to capture and submit the media data.

As previously discussed, in certain embodiments, the machine-readable sign may be encoded with a portion or all of the contact data and/or additional information for the first user that may be decoded by the device of the unknown second user and utilized by that device. Such decoding may depend on the second user and/or the device used by the second user. Thus, the second user's device may include one or more keys for decryption of data from an encoded machine-readable sign, which may output the data on the second device. The device may receive the keys by registering with the service provider or another entity as a specific device type and/or used by registered personnel that that first user allows release of the additional information. In various embodiments, the additional information may correspond to an allergy of the first user, a medicine taken by the first user, a medical history of the first user, or a prior injury of the first user. Other types of information may also be set by the first user, including financial information, authentication information, identification information, or any other types of information that may be pertinent to another user that may capture the machine-readable sign. Thus, the keys or other data/process necessary to decode the data in the machine-readable sign may be provided to the second user's device based on a status, position, or standing of the second user. The service provider may also possess the additional information for release on the satisfaction of certain conditions of the unknown second user capturing the sign, the device of the unknown second user, and/or a location or other user data of the first user. In such embodiments, the additional data may be released to the device of the second user based on information for the second user, such as a registered user status, medical service personnel, law enforcement officer, or other status. Note that "unknown" users can also include users known to the user, but not having contact information for contacts of the first user. Such "unknown" users may be casual co-workers and the like.

In various embodiments, the status may be set by the second user with the service provider, or may be determined by the service provider using past data, machine learning, or other data processing to determine the status of the second user. For example, data on the second user's device may be used to determine whether the second user is a medical personnel that can provide assistance, or such data may be determined through processing past locations, messages, employment history, etc., with a machine learning algorithm to make determinations of user statuses. The service provider may also utilize a location of the first user and/or second user to determine whether nearby devices to the first/second user should receive the additional information, for example, if the first user is located within a facility that may require the additional information (e.g., a hospital, police station, service facility, merchant storefront, etc.). The contact may also release the additional information to the second user or for transmission to nearby devices to the first user. Moreover, the service provider may also use the first user's device and/or the second user's device to locally broadcast the additional data, which may be encrypted or unencrypted for output to other nearby devices.

Thus, the service provider may provide services to allow unknown users to access and communicate with contacts of a user while preserving privacy on behalf of the contacts. In various cases, this may allow for alerting of contacts when determination of contact data for those contacts would normally be impossible. For example, in the case of an abduction, a user viewing the abduction or concerned with an event need only to capture media data that includes the visual sign so that contacts may be immediately contacted and authorities alerted with a location and media data of the occurrence. If a user loses a phone, a finder of the phone may be able to capture a displayed machine-readable code on the phone to return the phone to a contact and eventually the user. Moreover, if someone is injured in an accident, hurt at the gym, or otherwise incapacitated, a nearby employee, assisting user, or medical personnel may immediately contact the user's emergency contacts and may also receive certain information necessary to properly treat the injured user including avoiding medications causing allergies or determining the cause of the injury. Moreover, a user who is locked out or forgot a wallet and phone may be able to contact another user by requesting that a nearby user capture their machine-readable sign so that the contact may assist the user in the predicament. By utilizing the machine-readable sign, the contact information of the user and their contacts may remain hidden and discreet while still allowing for communications between parties.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a first communication device 110, a second communication device 140, and a service provider server 160 in communication over a network 170. A first user (not shown) may utilize first communication device 110 to utilize the various features available for first communication device 110, which may include processes and/or applications that may be used to capture a machine-readable sign, code, or other displayed content associated with a second user (not shown) utilizing second communication device 140. For example, the first user may view an event that the second user is involved in and wish to communicate information about the event to a contact of the second user. First communication device 110 may be used to capture the machine-readable sign, which may be displayed by second communication device 140 and/or another physical object of the second user. Service provider server 160 may receive media data of or associated with the machine-readable sign from first communication device 110 and utilize second communication device 140 to ensure the authenticity of the contact request to the second user's contact(s). If the request is validated based on data from second communication device 140, a message may be sent to the contact through a device of the contact or other communication pathway.

First communication device 110, second communication device 140, and service provider server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

First communication device 110 may be implemented as a communication device that may utilize appropriate hardware and software configured for wired and/or wireless communication with second communication device 140, and/or service provider server 160. For example, in one embodiment, first communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

First communication device 110 of FIG. 1 contains a service provider application 120, a camera 130, a location detection component 112, other applications 114, a database 116, and a communication module 118. Service provider application 120 and other applications 114 may correspond to executable processes, procedures, and/or applications with associated hardware. In other embodiments, first communication device 110 may include additional or different modules having specialized hardware and/or software as required.

Service provider application 120 may correspond to one or more processes to execute modules and associated devices of first communication device 110 to capture and/or upload media data of a machine-readable sign associated with a second user for second communication device 140 to service provider server 160 for processing, as well as provide additional information associated with capture of the media data and/or communication with a contact of the second user's device. Service provider application 120 may be utilized by a first user of first communication device 110 to provide an interface to permit the user associated with first communication device 110 to capture media data and/or load/access media data captured by another process of first communication device 110 to service provider application 120 for transmission to service provider server 160. Service provider application 120 may be implemented with a user interface enabling the user to capture media data, such as a viewfinder and one or more processes of camera 130 to capture media data, or may provide an interface to view captured media data and select media data for uploading to service provider server 160. Service provider application 120 may also be used to establish a user account, which may include contact data for the first user and may assist in tracking the first user. The media data may correspond to pre-recorded data being currently detected by camera 130, or may correspond to recently captured media content, such as an image of video that was captured by first communication device 110 using camera 130 and displayed in response to the recording of the media. In other embodiments, the media data may be accessed from stored media data, for example, media data stored to database 116 and/or service provider server 160. Service provider application 120 may display the media data in a viewfinder, a post-recording interface, and/or a video library. The media data may also be displayed with controls for recording the media data, deleting the media data, storing the media data to one or more databases including database 116 and/or database 166 of service provider server 160, uploading or downloading the media data, and/or adding an effect to the media data.

In various embodiments, service provider application 120 may correspond to a general browser application configured to retrieve, present, and communicate information over the Internet (e.g., utilize resources on the Internet) or a private network, which may include accessing a website of service provider server 160 to upload media data or share media data with the website through a streaming process. In other embodiments, service provider application 120 may include a dedicated application of service provider server 160, which may be configured to capture/upload media through one or more interfaces and associated processes. When capturing media data, service provider application 120 may also automatically capture additional data, such as metadata for an image/video (e.g., a timestamp for the data capture, geo-location, etc.). This data may be automatically shared with the media data to service provider server 160 and/or the device of the contact for the second user associated with second communication device 140. Service provider application 120 may also be used to input additional information by the first user associated with first communication device 110, which may include messages, additional images or video of the second user or the event that the second user is involved in, other nearby users or assistance being provided, event information, or other information that may assist in helping the second user. In certain embodiments, service provider server 160 may provide service application 120 with the contact data for the contact of the second user to allow first communication device 110 to communicate with the contact, or may provide additional information to first communication device 110, including user information for the second user, status of the second user, medical or historical information pertinent to the second user, an alert of assistance being sent or provided to the second user, or other helpful information.

Camera 130 corresponds to an optical device of first communication device 110 enabling a first user associated with first communication device 110 to capture or record images, including still and/or video images. Camera 130 may correspond to a digital camera on first communication device 110 (e.g., incorporated in first communication device 110 such as a mobile phone's digital camera in a traditional camera orientation and/or a forward facing camera orientation that captures one or more users as they use and view a display screen of first communication device 110) or associated with first communication device 110 (e.g., connected to first communication device 110 but incorporated within a body or structure of first communication device 110), or may more generally correspond to any device capable of capturing or recording an image, video, or other digital media data, including infrared imaging or other types imaging devices. As a digital camera, camera 130 may include a sensor array disposed on a semiconductor substrate having a plurality of photosensitive elements configured to detect incoming light. In other embodiments, other types of electromagnetic radiation sensors may be used, including infrared sensitive sensors/elements and the like.

Camera 130 may include various features, such as zoom, flash, focus correction, shutter speed controls, or other various features usable to capture one or more images or videos of the user and/or other users or objects. Camera 130 may include other media capture components, including a microphone to capture audio data and/or a touch element or screen that captures a biometric. Camera 130 may further display a preview and/or captured image to the user through another device of first communication device 110, such as a viewfinder, screen (e.g., mobile phone touch screen, tablet touch screen, and/or personal computer monitor), or other display. Camera 130 may interface with one or more applications of first communication device 110 to capture media data, such as images/videos, which may be used to determine one or more effects to apply prior to recording media data and/or perform post-processing of recorded media. Camera 130 may also be used to capture media data that is processed to determine reference data points or nodes for use in image processing and/or recognition processes and decoding of data. Communication device 110 and/or service provider application 120 may therefore use camera 130 to capture media data, which may be processed to determine contact data for a machine-readable sign in the media data.

Location detection component 112 corresponds to a hardware and/or software feature of first communication device 110 that assists in detecting a location of first communication device 110, for example, through a GPS locator and service, triangulation process, mapping application, check-in process/feature, short range wireless communications, or other location detection process. Location detection component 112 may be used to determine a location of first communication device 110, which may be shared with captured media data of a visual sign to determine where the visual sign is located and therefore where the second user corresponding to second communication device 140 that is in possession of the machine-readable sign is similarly located and requiring assistance from one of their preset contacts. Location detection component 112 may be accessed and utilized by service provider application 120 when capturing and/or uploading media data to provide location data with the media data for determination of the second user's location and the assistance required by the second user.

In various embodiments, first communication device 110 includes other applications 114 as may be desired in particular embodiments to provide features to first communication device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. Other applications 114 may include social networking applications, media viewing, and/or microblogging applications. Other applications 114 may therefore correspond to a message platform, a communication service, a social network, a microblogging service, a media sharing service, or other online resource used to exchange information with other users and services. Other applications 114 may also include various types of media capture applications, which may be used with camera 130 to capture media.

In various embodiments, other applications 114 may include financial applications, such as banking applications. Other applications 114 may also include other location detection applications, which may be used to determine a location for the user, such as a mapping, compass, and/or GPS application using location detection component 112. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use devices of first communication device 110, such as display devices capable of displaying information to users and other output devices.

First communication device 110 may further include database 116 stored to a transitory and/or non-transitory memory of first communication device 110, which may store various applications and data and be utilized during execution of various modules of first communication device 110. Thus, database 116 may include, for example, identifiers such as operating system registry entries, cookies associated with service provider application 120 and/or other applications 114, identifiers associated with hardware of first communication device 110, or other appropriate identifiers, such as identifiers used for payment/user/device authentication or identification, which may be communicated as identifying first communication device 110 to service provider server 160. Database 116 may include stored media data of a machine-readable sign, and may also include metadata or additional data for the media data for transmission to service provider server 160.

First communication device 110 includes at least one communication module 118 adapted to communicate with second communication device 140 and/or service provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Second communication device 140 may be implemented as a communication device that may utilize appropriate hardware and software configured for wired and/or wireless communication with first communication device 110 and/or service provider server 160. For example, in one embodiment, second communication device 140 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Second communication device 140 of FIG. 1 contains an emergency data application 150, a service provider application 152, a location detection component 154, a user data component 142, other applications 144, a database 146, and a communication module 148. Emergency data application 150, service provider application 152, and other applications 144 may correspond to executable processes, procedures, and/or applications with associated hardware. In other embodiments, second communication device 140 may include additional or different modules having specialized hardware and/or software as required.

Emergency data application 150 may correspond to one or more processes to execute modules and associated devices of second communication device 140 to establish a machine-readable sign for a second user associated with second communication device 140 and establish contact data for the machine-readable sign, as well as receive a request for user data and transmit the user data to service provider server 160 when a request to communicate with one or more contacts for the contact data is received by service provider server 160. Emergency data application 150 may be utilized by the second user of second communication device 140 to first select a machine-readable sign, which may correspond to an uploaded image or other graphical data, or may be selected from available signs, graphics, or other images available with service provider server 160. Once selected, emergency data application 150 may then provide an interface for the second user to select or enter contact data for one or more contacts that the second user would like to be associated with the machine-readable sign so that when the machine-readable sign is captured, one or more of the contacts may receive a notification. The contact data may be directly entered, or may be selected from uploaded, scraped, or mined contact data for the second user. Once the contact data is entered, service provider server 160 may generate the machine-readable sign and may provide the machine-readable sign as a digital or physical object to the second user.

In this regard, emergency data application 150 may also output the machine-readable sign selected by the second user for the contact data of the second user. For example, where the machine-readable sign is generated as a digital object that may be output by an output component of second communication device 140, second communication device 140 may display the machine-readable sign. The machine-readable sign may be displayed by emergency data application 150 in a lock screen of second communication device 140 so that the machine-readable sign may be read or viewed by another user/device when second communication device 140 is locked. In further embodiments, the machine-readable sign may be on another physical object, and emergency data application 150 may also determine current user data at a time that first communication device 110 is requesting a notification be sent to a contact of the second user, for example, a location of second communication device 140, biometrics of the second user, additional images or video, or other data that may be captured by user data component 142 and/or location detection component 154.

Service provider application 152 may correspond to one or more processes to execute modules and associated devices of second communication device 140 to interact with service provider server 160, for example, to assist in processing media data of captured machine-readable codes. Service provider application 152 may be utilized by a second user of second communication device 140 to interact with one or more components of second communication device 140 to determine user data and provide the user data to service provider server 160 based on a request from service provider server 160. In this regard, service provider application 152 may interact with emergency data application 150 to determine a user location, biometrics, or additional images/videos and provide the data to service provider server 160. Service provider application 152 may include a dedicated application of service provider server 160, which may be configured to capture/upload data automatically through one or more requests. This data may be automatically shared with service provider server 160 and/or the device of the contact for the second user associated with second communication device 140. Service provider application 152 may also be used to input additional information by the second user associated with second communication device 140, which may include messages, additional images or video of the second user or the event that the second user is involved in, other nearby users or assistance being provided, event information, or other information that may assist in helping the second user. Although emergency data application 152 is described as separate from service provider application 152, in various embodiments some or all of the processes of emergency data application 150 and service provider application 152 may be provided in the same application.

Location detection component 154 corresponds to a hardware and/or software feature of second communication device 140 that assists in detecting a location of second communication device 140, for example, through a GPS locator and service, triangulation process, mapping application, check-in process/feature, short range wireless communications, or other location detection process. Location detection component 154 may be used to determine a location of second communication device 140 by first communication device 110 and/or service provider server 160 through a request to detect the location based on captured media data of a machine-readable code. Location detection component 154 may be accessed and utilized by service provider application 152 when a request to communicate with a contact associated with a machine-readable code for second communication device 140 is scanned and submitted to service provider server 160. For example, location detection component 154 may be used to verify that first communication device 110 and second communication device 140 are at the same location or within a proximity range of acceptable co-locating between devices to issue the communications to the contacts of second communication device 140 associated with the machine-readable code. Location detection component 154 may also be used to provide an accurate location for second communication device 140 when the code is scanned and a communication is sent to the contact.

User data component 142 may correspond to one or more hardware components with associated software processes that may be used to determine user data for a second user associated with second communication device 140. The user data may correspond to user parameters for the second user and/or device information or detected device data for second communication device 140. In this regard, the user data may correspond to a geo-location of second communication device 140 that may be transmitted to service provider server 160 in order to verify and validate a request for contact data and communications with a registered contact for a machine-readable sign displayed by an object in possession of the second user. User data component 142 may therefore correspond to a GPS locator and service, triangulation process, mapping application, check-in process/feature, short range wireless communications, or other location detection process that detects a location of second communication device 140.

User data component 142 may further correspond to components and processes to detect other types of user data, including biometrics of the user. The biometrics may correspond to heart rate, perspiration, steps/pace, identification information (e.g., a fingerprint), or other user biometric. User data component 142 may include components internal to second communication device 140 to detect the biometrics, or may interface with another device, such as a wearable computing device. In further embodiments, user data component 142 may also include or interface with a media capture component to record audio, visual, or audiovisual content. Such components and processes may be used by emergency data application 150 with service provider server 160 to collect additional information for the second user when a request by first communication device 110 to transmit a notification to a contact of the second user is submitted to service provider server 160 through media data of a machine-readable sign for the second user.

In various embodiments, second communication device 140 includes other applications 144 as may be desired in particular embodiments to provide features to second communication device 140. For example, other applications 144 may include security applications for implementing client-side security features, programmatic client applications for interfacing with appropriate application programming interfaces (APIs) over network 170, or other types of applications. Other applications 144 may also include email, texting, voice and IM applications that allow a user to send and receive emails, calls, texts, and other notifications through network 170. Other applications 144 may include social networking applications, media viewing, and/or microblogging applications. Other applications 144 may therefore correspond to a message platform, a contact list, a social network, a microblogging service, a media sharing service, or other online resource used to exchange information with other users and services, which may be used to determine contacts of the second user associated with second communication device 140 including a phone number, a name, an online identifier, an online username, device identifier, network identifier, or other type of identifier for the other users.

In various embodiments, other applications 144 may include financial applications, such as banking applications. Other applications 144 may include device interfaces and other display modules that may receive input from the user and/or output information to the user. For example, other applications 144 may contain software programs, executable by a processor, including a graphical user interface (GUI) configured to provide an interface to the user. Other applications 144 may therefore use devices of second communication device 140, such as display devices capable of displaying information to users and other output devices.

Second communication device 140 may further include database 146 stored to a transitory and/or non-transitory memory of second communication device 140, which may store various applications and data and be utilized during execution of various modules of second communication device 140. Thus, database 146 may include, for example, identifiers such as operating system registry entries, cookies associated with emergency data application 150 and/or other applications 144, identifiers associated with hardware of second communication device 140, or other appropriate identifiers, such as identifiers used for payment/user/device authentication or identification, which may be communicated as identifying second communication device 140 to service provider server 160. Database 146 may include machine-readable sign data for a digital sign, as well as user data including geo-location data, contact/messaging data, biometrics, user images, etc.

Second communication device 140 includes at least one communication module 148 adapted to communicate with second communication device 140 and/or service provider server 160. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 148 may communicate directly with nearby devices using short range communications, such as Bluetooth Low Energy, LTE Direct, WiFi, radio frequency, infrared, Bluetooth, and near field communications.

Service provider server 160 may be maintained, for example, by an online service provider, which may provide services to communicate with contacts of an unknown user through capturing a machine-readable sign displayed by an object or device of the unknown user. In this regard, service provider server 160 includes one or more processing applications which may be configured to interact with first communication device 110, second communication device 140, a contact's communication device, and/or another device/server to facilitate communication with the unknown user's contacts. In one example, service provider server 160 may be provided by PAYPAL®, Inc. of San Jose, Calif., USA. However, in other embodiments, service provider server 160 may be maintained by or include another type of service provider, which may provide the aforementioned services to a plurality of users.

Service provider server 160 of FIG. 1 includes an emergency contact application 162, other applications 164, a database 166, and a network interface component 168. Emergency contact application 162 and other applications 164 may correspond to executable processes, procedures, and/or applications with associated hardware. In other embodiments, service provider server 160 may include additional or different modules having specialized hardware and/or software as required.

Emergency contact application 162 may correspond to one or more processes to execute software modules and associated specialized hardware of service provider server 160 to establish a machine-readable sign having associated contact data and provide communication services with contacts associated with the contact data when other users capture the machine-readable sign. In this regard, emergency contact application 162 may correspond to specialized hardware and/or software to first receive a request to establish a machine-readable sign for a second user associated with second communication device 140. The second user may be required to first establish an account with service provider server 160 or otherwise register user information and contact information with service provider server 160. In order to establish an account for the second user to utilize the communication services, emergency contact application 162 may receive information requesting establishment of the account. The information may include user personal information. Additionally the information may include a login, account name, password, PIN, or other account creation information. The second user may provide a name, address, social security communicate with contacts using the account. Emergency contact application 162 may utilize the information to establish the account, and may further determine contact data using the information through extracting, scraping, or mining the contact data from one or more online resources. In other embodiments, the second user may upload the contact data or enter the contact data during registration of a machine-readable sign. The second user may be provided with options to select a machine-readable sign, such as a library of pre-generated signs, codes, or other visually displayable items, or may be provided with one or more processes to generate the sign or code through provided input, including drawing or creating the sign or providing particular values to generate a code. The second user may also upload an image to be used as the sign, which may be processed by emergency contact application 162.

Once the sign is selected, emergency contact application 162 may then allow for selection and/or entry of contact data to associate with the sign, where the contact data may correspond to one or more contacts for the second user that are to receive a message when the machine-readable sign is captured and associated data is submitted to emergency contact application 162. Selection/entry of the contact data may occur through one or more interface elements, menus, and/or associated input processes. Emergency contact application 162 may then store the machine-readable sign with the contact data for future use. Additionally, emergency contact application 162 may issue the machine-readable sign in digital form to second communication device 140 and/or may request that the machine-readable sign be generated as a physical object that may be provided to the second user, for example, as a sticker, key fob, wallet card, etc.

Emergency contact application 162 may receive media data including the sign from first communication device 110, which may include metadata associated with capturing the media data (e.g., a time and location) and additional information provided by the first user associated with first communication device 110 when capturing the media data or provided additional information of the event that caused capture of the media data. In other embodiments, emergency contact application 162 may request the metadata and/or additional data from first communication device 110 or may determine such information from one or more other online resources. Emergency contact application 162 may utilize one or more image or object recognition processes with the media data to identify the machine-readable sign and determine the stored machine-readable sign and associated contact data. The media data may be compared to other images, videos, and/or stored data of previously extracted identifying data for the machine-readable sign by emergency contact application 162. For example, the sign features and other identifying data in the image may be compared through feature comparison to the stored sign to match the media data to the stored sign.

Once the contact data is determined, emergency contact application 162 may then determine one or more contacts to transmit a notification associated with first communication device 110 capturing the machine-readable sign of the second user associated with second communication device 140. Prior to determining the contacts and/or sending a communication to the contacts, emergency contact application 162 may also verify that the request to send a communication to one or more of the contacts based on the received media data is valid and not erroneous or fraudulent. In order to do so, emergency contact application 162 may determine whether a geo-location of first communication device 110 matches or is within a geo-fenced range of second communication device 140. Emergency contact application 162 may further query second communication device 140 to determine whether the second user may respond and deny the request to notify a contact, or may determine whether there are any other factors that may cause emergency contact application 162 to not transmit a notification to the contacts, such as other recent notifications sent based on other devices capturing the machine-readable sign (e.g., to avoid repeated notifying of the contacts).

In order to determine a contact, emergency contact application 162 may search for a closest located contact from the contact data based on the current locations of the contacts, or may establish a geo-fence around the location of first communication device 110 and/or second communication device 140 to alert all, part of, or at least one of the contacts within that geo-fence. The contact may also be determined based on a type of event occurring that requires the notification to the contact, such as a locked out event, abduction event, medical issue, financial issue, etc. The contact may also be determined to be medical personnel, law enforcement officer, or other contact not within the contact data depending on the event and/or emergency occurring. Once the contact is determined, a notification may be generated. The notification may include at least a location for first communication device 110 and/or second communication device 140. The notification may be generated with at least an alert that another user (e.g., the first user associated with first communication device 110, whose identification may be released in the notification or hidden) is capturing the machine-readable sign. The notification may further include a time and/or location of the capture of the machine-readable sign, such as a time that first communication device 110 captures the media data of the machine-readable sign and one or more geo-locations of first communication device 110 and/or second communication device 140. Moreover, the notification may include any additional information provided by first communication device 110 (e.g., a message, additional images/video, a type of event occurring, etc.) or determined by emergency contact application 162 using one or more available resources. Thus, the notification may be generated with additional data to assist the contact in providing assistance to the second user associated with second communication device 140, where the first user associated with first communication device 110 has captured media data of their machine-readable sign to request the assistance from the contact.

Emergency contact application 162 may determine a best or available communication pathway to transmit the notification to the contact to alert the contact. The notification may be sent through text message, voice call, email, application push message, device alert, or other communication pathway that may alert the contact. The notification may also be sent to another endpoint that may alert the contact, such as a direct or general work phone number during work hours or a building communication address/number. The notification may be transmitted using the communication pathway to alert the contact through a device of the contact. Emergency contact application 162 may further provide contact information for first communication device 110 in the notification, and may further provide first communication device 110 with a further notification of the contact's communication identifier to allow for direct communications between the parties.

In various embodiments, service provider server 160 includes other applications 164 as may be desired in particular embodiments to provide features to service provider server 160. For example, other applications 164 may include security applications for implementing server-side security features, programmatic client applications for interfacing with appropriate application programming interfaces (APIs) over network 170, or other types of applications. Other applications 164 may contain software programs, executable by a processor, including a graphical user interface (GUI), configured to provide an interface to the user when accessing service provider server 160, where the user or other users may interact with the GUI to more easily view and communicate information. In various embodiments, other applications 164 may include connection and/or communication applications, which may be utilized to communicate information to over network 170.

Additionally, service provider server 160 includes database 166. As previously discussed, a user may establish one or more accounts with service provider server 160. Accounts in database 166 may include user information, such as name, address, birth date, user financial information, user preferences, and/or other desired user data. Users may link to their respective accounts through an account, user, and/or device identifier. Thus, when an identifier is transmitted to service provider server 160, e.g., from first communication device 110 and/or second communication device 140, one or more accounts belonging to the users may be found. Database 166 may also store machine-readable signs with associated contact data. Moreover, media data capturing a machine-readable sign to request assistance for an unknown user may be stored to database 166 with metadata and/or additional data.

In various embodiments, service provider server 160 includes at least one network interface component 168 adapted to communicate first communication device 110, second communication device 140, and/or a device of a contact over network 170. In various embodiments, network interface component 168 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2A:
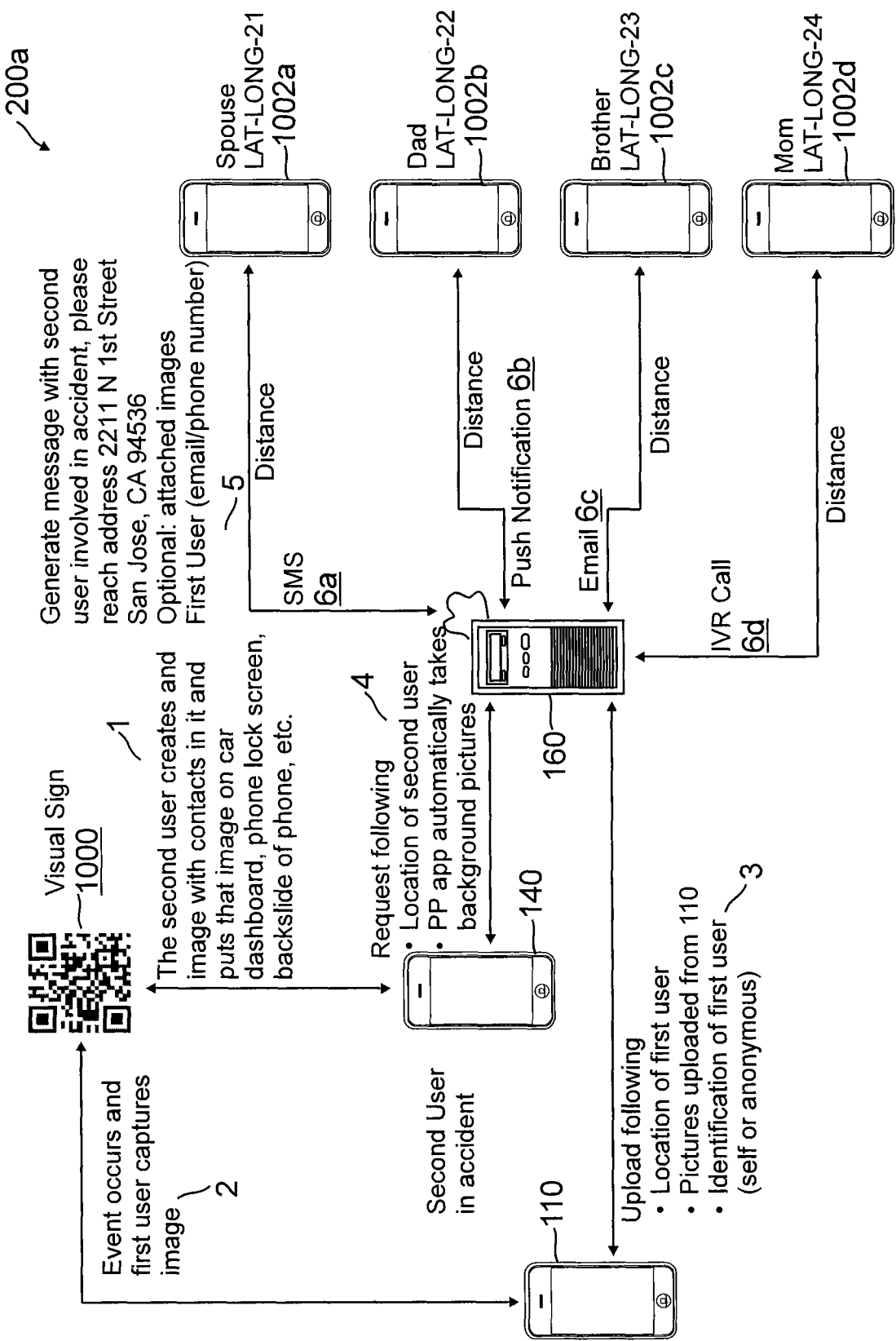
FIG. 2A is an exemplary communication device environment for retrieval of associate contact information and communication with associated devices through capturing a displayed visual code, according to an embodiment.

FIG. 2A is an exemplary communication device environment for retrieval of associated contact information and communication with associated devices through capturing a displayed machine-readable code, according to an embodiment. Note that one or more steps, processes, and methods described herein may be omitted, performed in a different sequence, or combined as desired or appropriate.

Flowchart 200a shows an exemplary process for a service provider to determine whether to transmit a notification to a contact of a user based on the user's machine-readable sign being captured by an unknown other user's device. The unknown user in flowchart 200a may utilize first communication device 110 discussed in reference to first communication device 110 in system 100 of FIG. 1, while the user having the machine-readable sign may utilize second communication device 140, discussed in reference to second communication device 140 in system 100 of FIG. 1. Moreover, flowchart 200a includes service provider server 160 discussed in reference to system 100 of FIG. 1. In order to retain user numbering from system 100 of FIG. 1, a first user may correspond to the unknown user capturing the media data of the visual sign using first communication device 110, while the user having contacts registered with the visual sign is referred to as the second user associated with visual sign 1000 and second communication device 140. Additionally, the user's contacts may utilize a contact device 1002a, a contact device 1002b, a contact device 1002c, and a contact device 1002d.

At step 1, the second user creates an image or other machine-readable sign 1000 with one or more contacts and places that sign on a car dashboard, phone lock screen, backside of the phone, or other physical object so that the sign is displayed. Machine-readable sign 1000 is shown in flowchart 200a as being a QR code, but may also correspond to other types of codes, images, logos, or graphics, including barcodes, a particular image, a selfie or other image of a user (which may be processed using facial recognition so that the second user does not need a machine-readable sign but instead may have their likeness captured in media data and identified through facial recognition), and/or a Rorschach ink blot. Moreover, machine-readable sign 1000 may include a logo of service provider server 160 and/or instructions that inform other users of what machine-readable sign 1000 is used for.

At step 2, an event occurs and the first user captures an image of machine-readable sign 1000 using first communication device 110. The media data may therefore include an image or a video of machine-readable sign 1000 for the second user (or may include a representation of the second user if the second user's selfie/image is used). First communication device 110 may utilize an application for service provider server 160 to transmit the media data to service provider server 160 or may upload the media data to a website/dropbox/online resource for service provider server 160, at step 3. Further at step 3, the location of the first user and/or first communication device 110 may also be uploaded. Other data may also be shared at step 3, such as pictures uploaded from first communication device 110 and/or identification of the first user, such as a self or anonymous status. Once uploaded, service provider server 160 may process the data.

At step 4, service provider server 160 may request data from second communication device 140 in order to validate the communication request with contact devices 1002*a-d* and to determine additional information necessary to notify contact devices 1002*a-d*. For example, service provider server 160 may request a location of the second user from second communication device 140 and/or may automatically take background pictures or video to determine additional information. Biometrics may also be captured. Service provider server 160 may then verify that the second user requires assistance by performing location matching between the first user and the second user through the geo-locations of first communication device 110 and second communication device 140. At step 5, a notification or message is generated for one or more contacts, which may include the information from the media data and/or received from first communication device 110/second communication device 140. For example, the notification or message may include an alert that the second user is involved in an event, such as an accident at a street address. Additional location data, images, and/or contact information for the first user may be provided with the notification.

Service provider server 160 may then determine one or more of contact devices 1002*a-d* to transmit the notification, which may be based on geo-locations detected for each of contact devices 1002*a-d*. At step 6*a*, a distance may be determined for contact device 1002*a*, and a communication pathway may be determined, such as an SMS message that is likely to be seen or used by the spouse contact for contact device 1002*a*. At step 6*b*, a distance may be determined for contact device 1002*b*, and a communication pathway may be determined, such as a push notification that is likely to be seen or used by the dad contact for contact device 1002*b*. At step 6*c*, a distance may be determined for contact device 1002*c*, and a communication pathway may be determined, such as an email message that is likely to be seen or used by the brother contact for contact device 1002*c*. At step 6*d*, a distance may be determined for contact device 1002*d*, and an a communication pathway may be determined, such as a call using an interactive voice response (IVR) system that is likely to be received by the mom contact for contact device 1002*d*. One or more of steps 6*a-d* may be executed depending on the distances, the preferences for contact notification transmission by the second user, and/or the communication pathways.

Figure 2B:
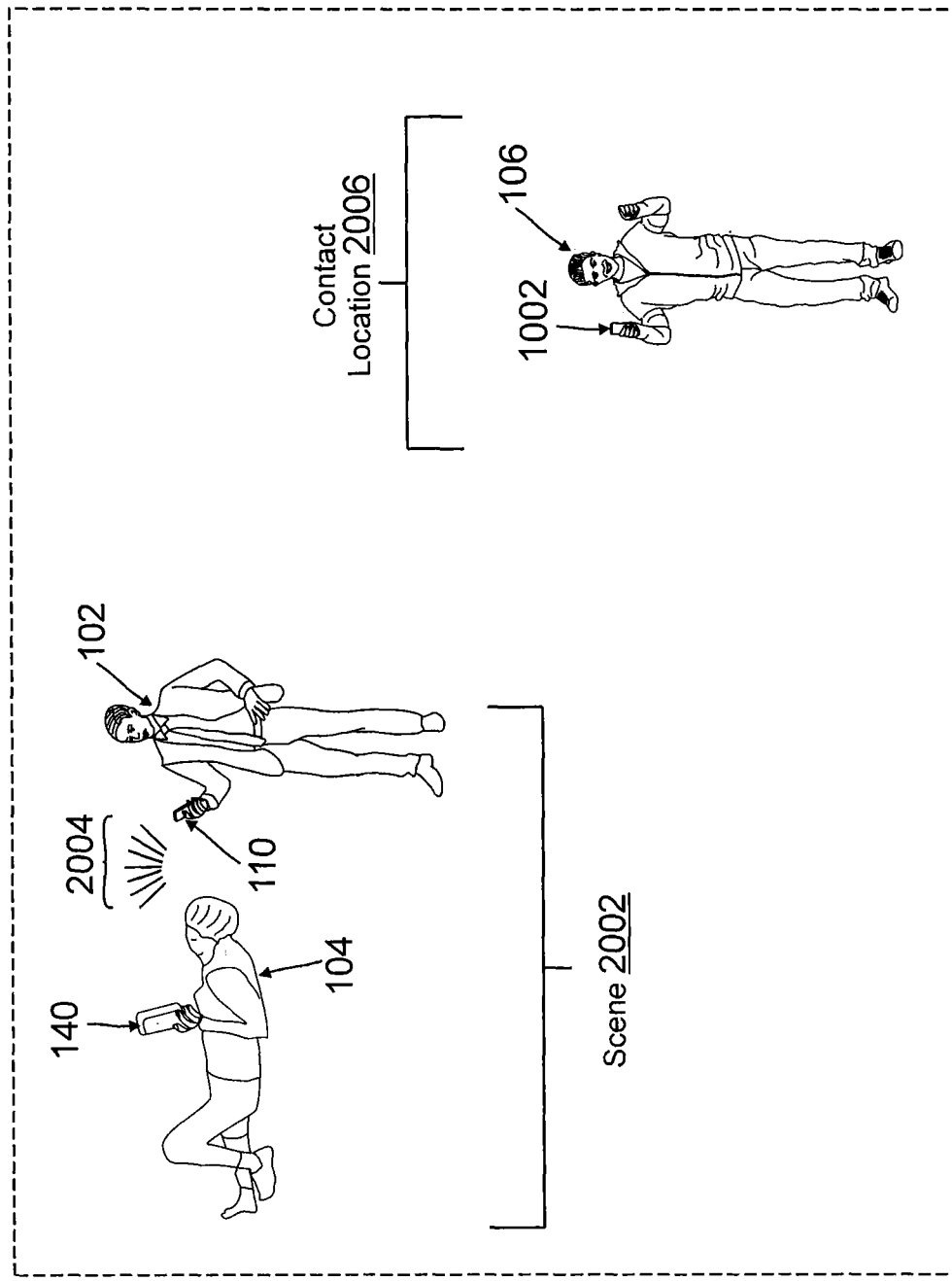
FIG. 2B is an exemplary real-world environment where a first user may capture a visual code of a second user to communicate with the second user's contacts, according to an embodiment.

FIG. 2B is an exemplary real-world environment where a first user may capture a machine-readable code of a second user to communicate with the second user's contacts, according to an embodiment. Real-world environment 200*b* includes a user 102, such as the first user discussed in reference to system 100 of FIG. 1, who may be in possession of first communication device 110 corresponding generally to the features, processes, and components described in reference to system 100 of FIG. 1. In this regard, user 102 may utilize first communication device 110 to capture a visual image displayed on or by second communication device 140 corresponding generally to the features, processes, and components described in reference to system 100 of FIG. 1.

An event 2004 may occur within real-world environment 200*b* at a scene 2002, which may correspond to an accident, crime, injury, or other type of personal event that may require assistance from a known contact 106 by a user 104 associated with second communication device 140. Other types of personal events may include financial events, access to locations, objects, or vehicles, or other types of events where user 104 is unable to contact and communicate with known contact 106. Thus, user 102 may utilize first communication device 110 to capture a machine-readable code displayed on, by, or nearby user 104 and/or second communication device 140 to assist user 104 in alerting known contact 106. A service provider may receive media data of the visual code from first communication device 110 and may utilize first communication device 110 and/or second communication device 140 (or data received from such devices) to generate a notification for known contact 106.

The notification may include information about scene 2002, such as a location. The notification may also include additional data, such as information about event 2004, a time of event 2004, a message from user 102 and/or user 104, and/or additional images or video of event 2004. The service provider may determine that known contact 106 at a contact location 2006 is within geo-fence 2000, and therefore may be able to provide assistance to user 104. Thus, the service provider may transmit the notification to contact device 1002 of known contact 106 so that known contact 106 may travel from contact location 2006 to scene 2002 to assist user 104 or provide other assistance, for example, by communicating with user 102 using first communication device 110 or alerting another user or assistance provider (e.g., health care or law enforcement assistance).

Figure 3:
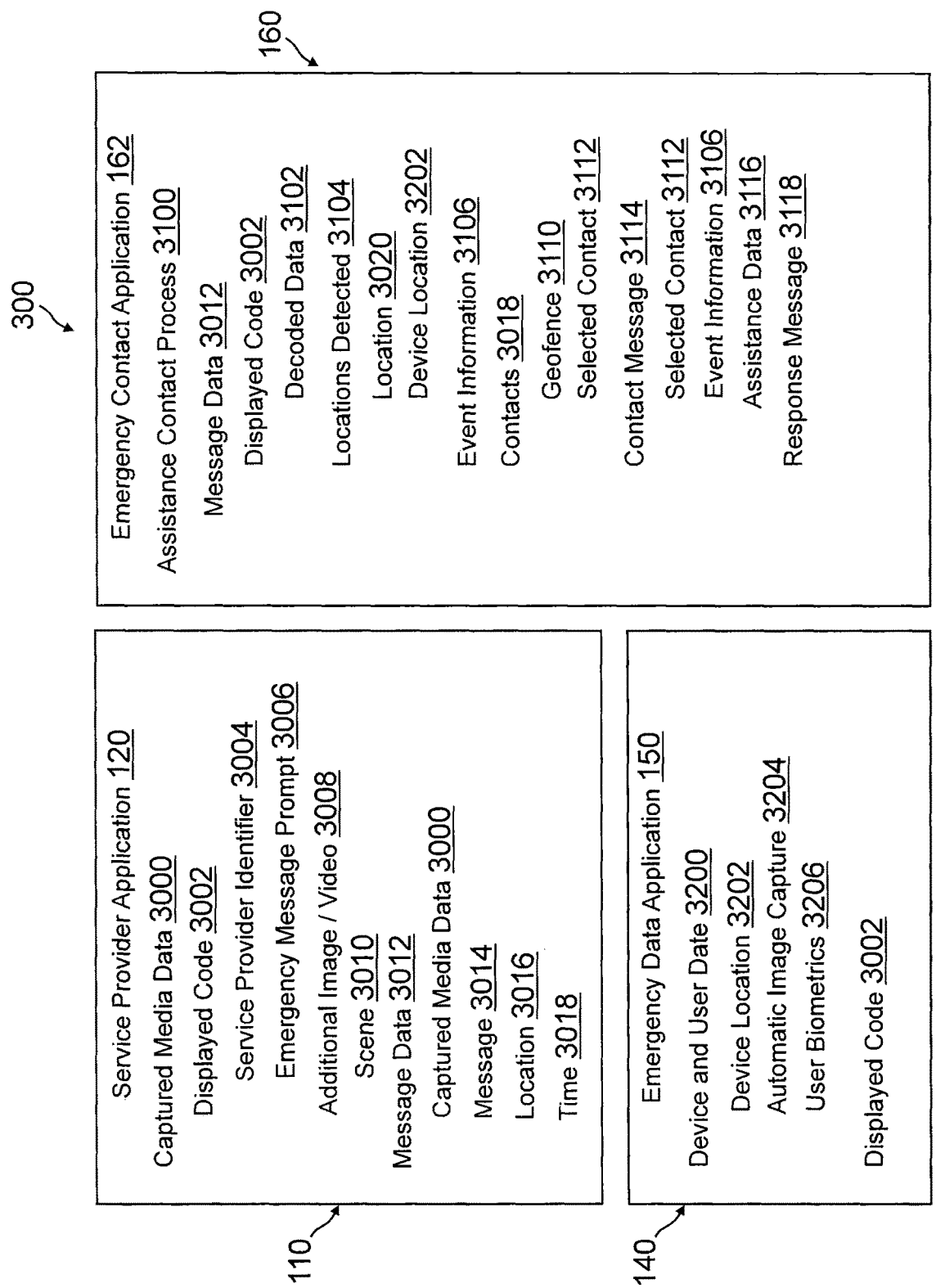
FIG. 3 is an exemplary system environment having a first communication device capture a visual code of a first for communication with a second user known to the first user using a service provider, according to an embodiment.

FIG. 3 is an exemplary system environment having a first communication device capture a machine-readable code of a first for communication with a second user known to the first user using a service provider, according to an embodiment. Environment 300 of FIG. 3 includes first communication device 110, second communication device 140, and service provider server 160 each discussed in reference to the disclosed systems, devices, and servers in system 100 of FIG. 1.

In environment 300, first communication device 110 executes service provider application 120 to provide the features and processes discussed in reference to system 100 of FIG. 1. In this regard, service provider application 120 includes data and processes that may be used to request that a notification, message, or alert be sent to a contact device associated with second communication device 140. In this regard, service provider application 120 includes captured media data 3000, which may be of a machine-readable code 3002 having a service provider identifier 3004. In various embodiments, machine-readable code 3002 may include data that causes an emergency message prompt 3006 by service provider application 120. Captured media data 3000 may be associated with additional image/video 3008 of scene 3010 that may correspond to the event that caused capture of captured media data 3000. Service provider application 120 may then generate message data 3012 to transmit to service provider server 160 for processing to notify the contact device for second communication device 140, which may include captured media data 3000, as well as a message 3014, a location 3016, and a time 3018 for captured media data 3000.

Service provider server 160 may then receive message data 3012. Service provider server 160 executes emergency contact application 162 to provide the features and processes discussed in reference to system 100 of FIG. 1. In this regard, emergency contact application 162 may process message data 3012 to determine a contact for second communication device 140 that may provide assistance to the user associated with second communication device 140. Thus, an assistance contact process 3100 may process message data 3012 to match machine-readable code 3002 to a database of displayed codes and their associated contact data and determine contacts 3018. In certain embodiments, this may include determining decoded data 3012 for machine-readable code 3002. Assistance contact process 3100 may further process locations detected 3104 for first communication device 110 (e.g., location 3020) and second communication device 140 (e.g., a device location 3202) to perform matching and verification of the request to transmit a notification to a contact. Assistance contact process 3100 may also determine event information 3106 associated with the receipt of message data 3012.

Using displayed code 3002, assistance contact process 3100 may retrieve contacts 3018. A geo-fence 3110 or other proximity location process may be utilized to determine a selected contact 3112 that may assist the user associated with second communication device 140. A contact message 3114 may be generated for the selected contact 3112, which may include the event information 3106, as well as any assistance data 3116 that may assist in providing the assistance (e.g., medical information, biometrics, images, etc.). A response message 3118 may also be received, which may correspond to a request to contact first communication device 110 by the contact's device or other information that may assist in resolving the assistance notification.

Second communication device 140 executes emergency data application 150 to provide the features and processes discussed in reference to system 100 of FIG. 1. In this regard, second communication device 140 may provide data that may assist in generating an assistance notification based on first communication device 110 capturing a machine-readable sign and/or resolving the notification. Emergency data application 150 includes device and user data 3200 that may be provided to service provider server 160 in response to a request to determine additional information to verify a request for an assistance notification based on media data of a captured machine-readable sign and/or to generate the notification. Thus, device and user data 3200 includes a device location 3202, an automatic image capture 3204, and user biometrics 3206. Additionally, in certain embodiments, second communication device 140 may further output machine-readable code 3002 for recording by first communication device 110.

Figure 4:
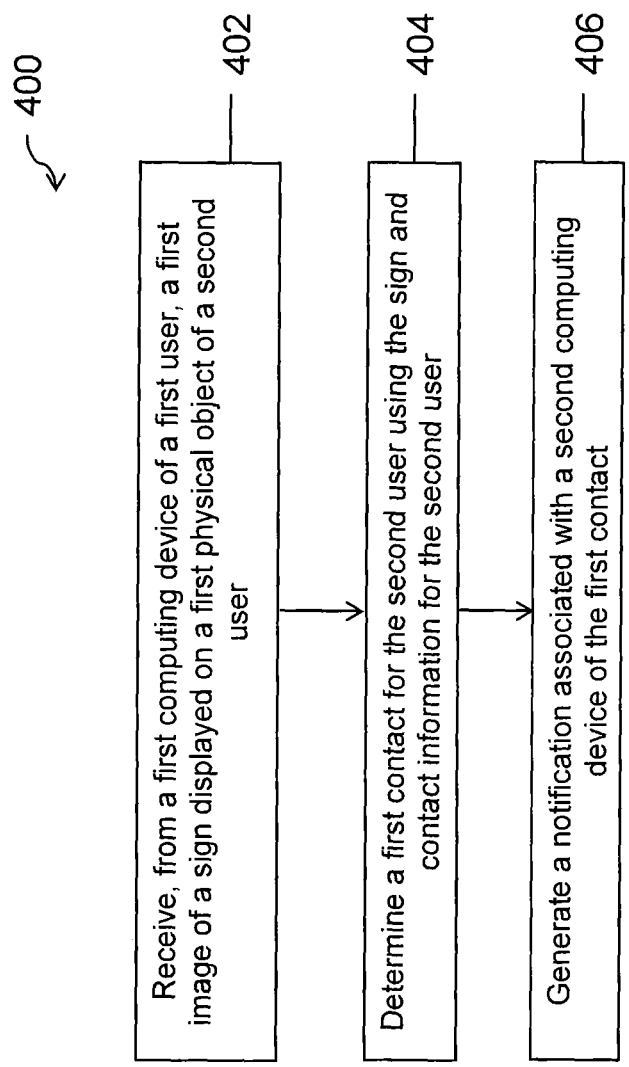
FIG. 4 is a flowchart of an exemplary process for visual code displays for retrieval of associated contact data by unknown devices, according to an embodiment.

FIG. 4 is a flowchart of an exemplary process for machine-readable code displays for retrieval of associated contact data by unknown devices, according to an embodiment. Note that one or more steps, processes, and methods described herein for flowchart 400 of FIG. 4 may be omitted, performed in a different sequence, or combined as desired or appropriate.

At step 402 of flowchart 400, a first image of a machine-readable sign displayed on a first physical object of a second user is received from a first computing device of a first user by a service provider system. The service provider system may be configured to receive images affixed to physical objects and communicate with at least one contact associated with each of the images. The first physical object may comprise one of a mobile phone, a key fob, a key tag, a physical image affixed to a surface, a wallet card, or a mobile computing device case. Status information for the second user may also be received, which may comprise at least one of a message by the first user transmitted with the first image to the service provider system, a second image of a present status of the second user captured by the first user using the first computing device, or current user biometrics captured by a third computing device associated with the second user.

A first contact for the second user is determined using the machine-readable sign and contact information for the second user, at step 404 of flowchart 400. The first contact may comprise one of a family member, a friend, or a medical personnel, which may be determined using one of contacts of the second user, social networking connections of the second user, pre-set emergency contact preferences by the second user, or a medical file of the second user. The machine-readable sign comprises one of a barcode, a QR code, or a unique graphical image. In such embodiments, determining the contact may comprise identifying a service provider identifier in the sign and determining contact information set by the second user for the sign, wherein the contact information comprises the first contact. The first image may comprise a first location for the first computing device, wherein the contact information comprises a plurality of contacts for the second user. In such embodiments, determining the first contact may comprise determining a current location for each of the plurality of contacts and determining that a second location of the first contact is within a closest proximity range of the first location, wherein the closest proximity range comprises a geo-fence around the first location.

At step 406 of flowchart 400, a notification associated with a second computing device of the first contact is generated. In may further be determined that one of the first computing device is a certified user device or the second user is located in a registered facility, and user historical information for the second user may be communicated to the second computing device. A communication pathway for transmission of the notification may be determined, wherein the communication pathway comprises one of a voice phone call, a text message, an application push notification, or an email. The notification may be transmitted using the communication pathway. The first image may further comprise location data for capture of the first image by the first computing device, and the notification may be transmitted to the second computing device of the first contact, wherein the notification further comprises, the location data, a time of receipt of the first image, and an alert associated with receipt of the first image from the first computing device. In other embodiments, the notification may be transmitted to the first computing device of the first user, wherein the notification comprises a first contact identifier for the second computing device used for communication by the first computing device with the second computing device.

In various embodiments, the machine-readable sign may be associated with tiered release statuses for release of personal information for the second user to users imaging the machine-readable sign based on a status of the users, wherein the tiered release statuses comprises an unknown user status for unknown users of the second user, a known associate status for known associates of the second user, and an intermediate status for a certified user. In such embodiments, the status for the first user may be determined using the tiered release statuses, and the notification may be generated using the status. The first image may comprise a first location of the first computing device, and prior to generating the notification, a second location of the second user may be determined using a third computing device of the second user. It may then further be determined that the first location and the second location are within a maximum allowable difference for separation of the first computing device and the third computing device when the first computing device captures the first image prior to generating the notification.

Figure 5:
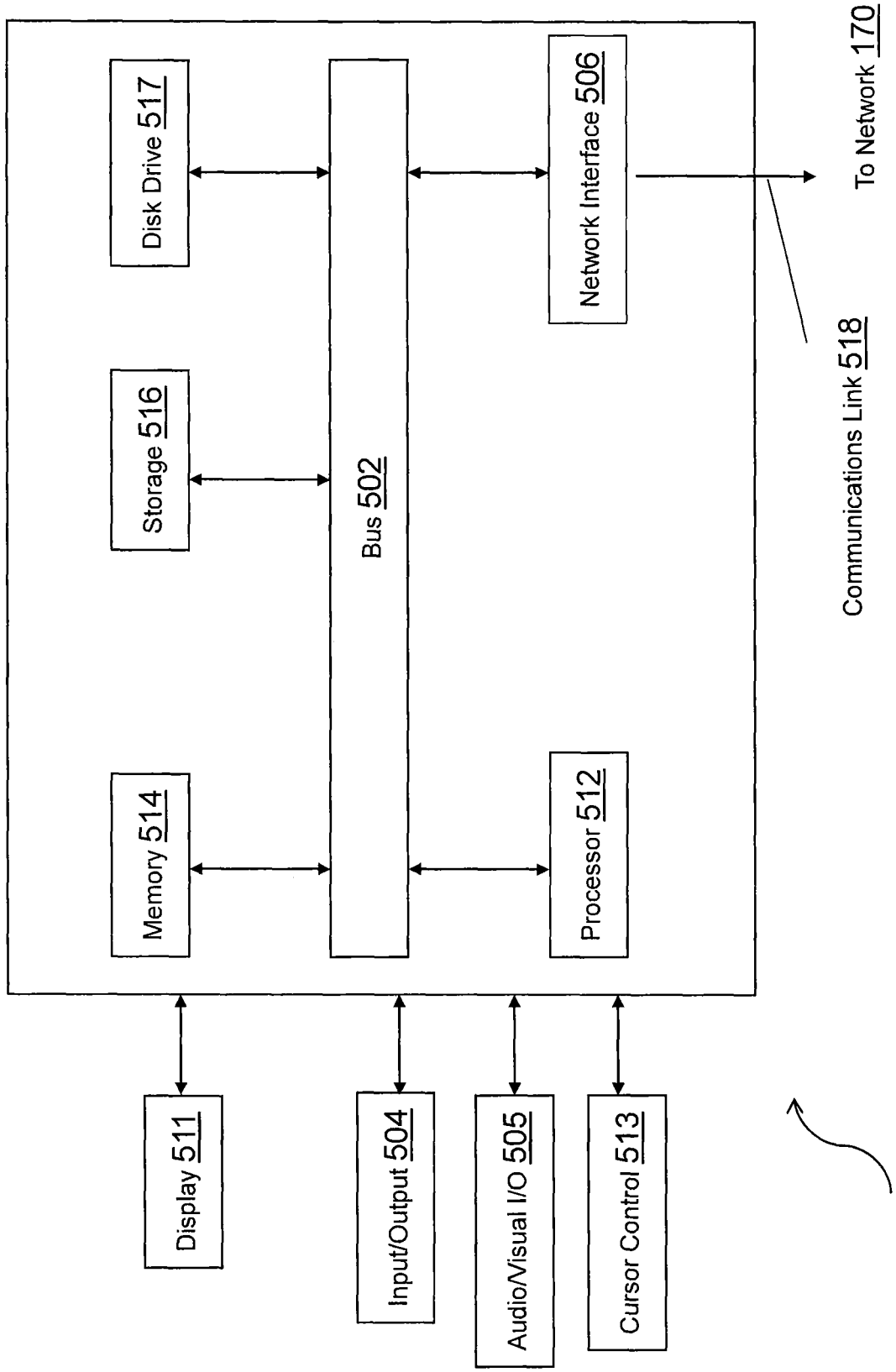
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
   a network interface component configured to receive images affixed to physical objects and communicate with at least one contact associated with each of the images;
   a non-transitory memory storing instructions; and
   one or more hardware processors couple to the non-transitory memory and configured to read the instructions from the non-transitory memory to cause the service provider system to perform operations comprising:
   receiving, from a first computing device of a first user, a first image of a machine-readable sign displayed on a physical object of a second user, wherein the first image comprises a timestamp associated with the first image;
   in response to receiving the first image from the first computing device, detecting a biometric reading of the second user from a second computing device of the second user;
   determining that the biometric reading and the timestamp indicate a user condition requiring a communication with a contact of the second user, wherein the contact is different than the first user and the second user;
   determining the contact for the second user based on contact information for the second user, wherein the contact information comprises a user-specified contact specific to the user condition;
   generating a notification associated with a contact computing device of the contact, wherein the notification comprises content corresponding to the biometric reading and the user condition;
   selecting one of a plurality of communication pathways for transmission of the notification to the contact computing device based on at least one previous message between the contact and the second user; and
   transmitting the notification to the contact computing device through the one of the plurality of communication pathways.

2. The service provider system of claim 1, wherein the first image further comprises location data corresponding to a capture of the first image by the first computing device, and wherein the notification further comprises, the location data, the timestamp of the first image, and an alert associated with the machine-readable sign.

3. The service provider system of claim 1, wherein the operations further comprise:
   transmitting the notification to the first computing device of the first user, wherein the notification comprises a first contact identifier for the contact computing device used for communication by the first computing device with the contact computing device.

4. The service provider system of claim 1, wherein the machine-readable sign is associated with tiered release statuses for release of personal information for the second user to users capturing the machine-readable sign based on a status of the users, wherein the tiered release statuses comprise an unknown user status for unknown users of the second user, a known associate status for known associates of the second user, and an intermediate status for a certified user, and wherein the operations further comprise:
   determining the status for the first user using the tiered release statuses,
   wherein the notification is based on the status.

5. The service provider system of claim 1, wherein the operations further comprise:
   determining that one of the first computing device is a certified user device or the second user is located in a registered facility; and
   communicating user historical information for the second user to the contact computing device.

6. The service provider system of claim 1, wherein the first image indicates a first location for the first computing device, wherein the contact information comprises a plurality of contacts for the second user, and wherein the determining the contact comprises:
   determining a current location for each of the plurality of contacts; and
   determining that a second location of the contact is within a geo-fence around the first location.

7. The service provider system of claim 1, wherein the receiving the first image further comprises receiving status information for the second user, and wherein the status information comprises at least one of a message by the first user transmitted with the first image to the service provider system, or a second image of a present status of the second user captured by the first user using the first computing device.

8. The service provider system of claim 1, wherein the one of the plurality of communication pathways comprises one of a voice phone call, a text message, an application push notification, or an email.

9. The service provider system of claim 1, wherein the physical object comprises one of a mobile phone, a key fob, a key tag, a physical image affixed to a surface, a wallet card, or a mobile computing device case.

10. The service provider system of claim 1, wherein the contact comprises one of a family member or a medical personnel, and wherein the contact is determined using one of contacts of the second user, social networking connections of the second user, pre-set emergency contact preferences by the second user, or a medical file of the second user.

11. The service provider system of claim 1, wherein the machine-readable sign comprises one of a barcode, a QR code, or a unique graphical image, and wherein the determining the contact comprises:
    identifying a service provider identifier in the machine-readable sign; and
    determining contact information set by the second user for the machine-readable sign, wherein the contact information comprises the contact.

12. The service provider system of claim 1, wherein the first image identifies a first location of the first computing device, and wherein prior to generating the notification, the operations further comprise:
    determining a second location of the second user using the second computing device of the second user; and
    determining that the first location and the second location are within a maximum allowable difference for separation of the first computing device and the second computing device when the first computing device captures the first image.

13. A method comprising:
    receiving, from a first computing device of a first user, a first image of a machine-readable sign displayed on a physical object of a second user, wherein the first image comprises a timestamp associated with the first image;
    in response to receiving the first image from the first computing device, detecting a biometric reading of the second user from a second computing device of the second user;

determining that the biometric reading and the timestamp indicate a user condition requiring a communication with a contact of the second user, wherein the contact is different than the first user and the second user;

determining the contact for the second user based on contact information for the second user, wherein the contact information comprises a user-specified contact specific to the user condition;

generating a notification associated with a contact computing device of the contact, wherein the notification comprises content corresponding to the biometric reading and the user condition;

selecting one of a plurality of communication pathways for transmission of the notification to the contact computing device based on at least one previous message between the contact and the second user; and transmitting the notification to the contact computing device through the one of the plurality of communication pathways.

14. The method of claim 13, wherein the notification further comprises location data of the first image, the timestamp of the first image, and an alert associated with the machine-readable sign.

15. The method of claim 13, further comprising:
transmitting the notification to the first computing device of the first user, wherein the notification comprises a contact identifier for the contact computing device used for communication by the first computing device with the contact computing device.

16. The method of claim 13, wherein the machine-readable sign is associated with tiered release statuses for release of personal information for the second user to users capturing the machine-readable sign based on a status of the users, wherein the tiered release statuses comprise an unknown user status for unknown users of the second user, a known associate status for known associates of the second user, and an intermediate status for a certified user, and wherein the method further comprises:
determining the status for the first user using the tiered release statuses,
wherein the notification is based on the status.

17. The method of claim 13, further comprising:
determining that one of the first computing device is a certified user device or the second user is located in a registered facility; and
communicating user historical information for the second user to the contact computing device.

18. The method of claim 13, wherein the first image indicates a first location for the first computing device, wherein the contact information comprises a plurality of contacts for the second user, and wherein the determining the contact comprises:
determining a current location for each of the plurality of contacts; and
determining that a second location of the contact is within a geo-fence around the first location.

19. The method of claim 13, wherein the machine-readable sign comprises one of a barcode, a QR code, or a unique graphical image, and wherein the determining the contact comprises:
identifying a service provider identifier in the machine-readable sign; and
determining contact information set by the second user for the machine-readable sign, wherein the contact information comprises the contact.

20. A non-transitory machine-readable medium having stored thereon machine-readable instructions executable to cause a machine to perform operations comprising:
receiving, from a first computing device of a first user, a first image of a machine-readable sign displayed on a physical object of a second user, wherein the first image comprises a timestamp associated with the first image;

in response to receiving the first image from the first computing device, detecting a biometric reading of the second user from a second computing device of the second user;

determining that the biometric reading and the timestamp indicate a user condition requiring communication with a contact of the second user, wherein the contact is different than the first user and the second user;

determining the contact for the second user based on the machine-readable sign and contact information for the second user, wherein the contact information comprises a user-specified contact specific to the user condition;

generating a notification associated with a contact computing device of the contact, wherein the notification comprises content corresponding to the biometric reading and the user condition;

selecting one of a plurality of communication pathways for transmission of the notification to the contact computing device based on at least one previous message between the contact and the second user; and transmitting the notification to the contact computing device through the one of the plurality of communication pathways.

* * * * *

UNITED STATES PATENT AND TRADEMARK OFFICE
CERTIFICATE OF CORRECTION

PATENT NO. : 10,594,818 B2
APPLICATION NO. : 15/917367
DATED : March 17, 2020
INVENTOR(S) : Jigar Rajnikant Gosalia Page 1 of 1

It is certified that error appears in the above-identified patent and that said Letters Patent is hereby corrected as shown below:

In the Claims
In Column 29, Lines 26-27, change "comprises a contact identifier" to --comprises a first contact identifier--

Signed and Sealed this
Twenty-fourth Day of November, 2020

Andrei Iancu
*Director of the United States Patent and Trademark Office*